(12) United States Patent
Harber et al.

(10) Patent No.: US 8,401,743 B2
(45) Date of Patent: Mar. 19, 2013

(54) MOTOR GRADER BLADE POSITIONING SYSTEM AND METHOD

(75) Inventors: Neil V. Harber, Holy Cross, IA (US); Richard A. Valenzuela, East Moline, IL (US); Jed D. Polzin, Platteville, WI (US); James L. Montgomery, Dubuque, IA (US); David J. Klas, New Vienna, IA (US)

(73) Assignee: Deere & Company, Moline, IL (US)

( * ) Notice: Subject to any disclaimer, the term of this patent is extended or adjusted under 35 U.S.C. 154(b) by 814 days.

(21) Appl. No.: 11/837,160

(22) Filed: Aug. 10, 2007

(65) Prior Publication Data

US 2009/0043459 A1 Feb. 12, 2009

(51) Int. Cl.
*G06F 19/00* (2011.01)
*A01B 63/00* (2006.01)

(52) U.S. Cl. .............................. 701/50; 172/5

(58) Field of Classification Search ................ 172/1–12; 701/50, 80–97, 110, 114; 37/205–223, 233, 37/236, 240, 22, 2, 246–252, 264, 266, 271, 37/305, 347–393, 411–460, 901–908; 56/10.1, 56/10.2 R, 10.3, 10.4, 10.2 A–10.2 H, 10.2 J, 56/10.5–17.6
See application file for complete search history.

(56) References Cited

U.S. PATENT DOCUMENTS

| | | | | |
|---|---|---|---|---|
| 3,908,765 A * | 9/1975 | Hawkins | ........................ | 172/4.5 |
| 6,032,093 A * | 2/2000 | Denbraber et al. | ............. | 701/50 |
| 6,064,933 A * | 5/2000 | Rocke | .............................. | 701/50 |
| 6,129,156 A | 10/2000 | Boast et al. | ..................... | 172/4.5 |
| 7,110,892 B2 * | 9/2006 | Kim | ................................. | 702/41 |
| 2001/0016794 A1 * | 8/2001 | Falck et al. | ..................... | 701/50 |
| 2006/0218912 A1 * | 10/2006 | Price et al. | ..................... | 60/459 |
| 2007/0284121 A1 * | 12/2007 | Montgomery et al. | ........... | 172/2 |
| 2008/0142232 A1 * | 6/2008 | Palmer et al. | ..................... | 172/2 |

OTHER PUBLICATIONS

Bradley et al., "The Development, Control and Operation of an Autonomous Robotic Excavator, Journal of Intelligent and Robotic Systems", 21:73-97, 1998, Kluwer Academic Publishers.*

* cited by examiner

*Primary Examiner* — James Trammell
*Assistant Examiner* — Muhammad Shafi
(74) *Attorney, Agent, or Firm* — Taylor IP, P.C.

(57) ABSTRACT

A ground engaging vehicle having a tool connected to the vehicle, at least one actuator coupled to the tool and an electronic controller. The electronic controller is controllably coupled to the at least one actuator. The controller includes an operator interface. The controller is configured for issuing a plurality of commands, recording the commands, positioning the tool and replaying at least some of the commands. The issuing step includes issuing a plurality of commands to the at least one actuator using the operator interface to place the tool in a position relative to the vehicle. The recording step records the commands issued in the issuing step. The positioning step includes positioning the tool in another position different from the position. The replaying step includes replaying at least some of the commands recorded in the recording step, thereby repositioning the tool substantially in the original position.

20 Claims, 3 Drawing Sheets

MOTOR GRADER BLADE POSITIONING SYSTEM AND METHOD

FIELD OF THE INVENTION

The present invention pertains to a ground engaging vehicle, and, more particularly to a motor grader blade positioning system and method of positioning the grader blade.

BACKGROUND OF THE INVENTION

Ground engaging vehicles having a blade are often utilized to move and sculpt a surface layer of earth. Motor graders in particular are used as finishing tools in putting a finish grade on a layer of gravel, stone, earth or other aggregate material. Motor graders include a blade, which can be also referred to as a moldboard or implement. The blade moves aggregate from side to side and smoothes the aggregate and/or earth material generally in multiple passes thereover. Adjusting the blade to accomplish the task includes several aspects of blade attitude, such as the cutting angle, the height of the blade, the blade side shift and a draw bar side shift. Several hand controls are utilized to operate the multiple blade and grader adjustments.

Conventionally, articulated motor graders include a fore and aft extending mainframe that is supported on wheels. The rear portion of the mainframe is articulated and is connected to an engine frame supported on traction wheels. At the rear end of the mainframe an operator station is mounted including controls for steering and adjusting of the various components of the motor grader. A saddle structure is often mounted for suspendably supporting the ground engaging blade through linkages connected to hydraulic cylinders or by way of a direction connection of hydraulic cylinders. During the grading operation blade loads are transmitted to a draw bar that is connected to the front portion of the main frame. The load created by the movement of the blade against the aggregate is transferred to the forward section of the mainframe.

The operator controls allow for the positioning not only of the blade but the selection of the speed and direction of the grader while it is under operation. Grading of the aggregate is often a repetitive process requiring the readjustment of several variables multiple times to similar if not identical positions.

What is needed in the art is a system to assist the operator in repetitively adjusting the controls of the grader system.

SUMMARY OF THE INVENTION

The present invention provides a ground engaging vehicle having a tool connected to the vehicle, at least one actuator coupled to the tool and an electronic controller. The electronic controller is controllably coupled to the at least one actuator. The controller includes an operator interface. The controller is configured for issuing a plurality of commands, recording the commands, positioning the tool and replaying at least some of the commands. The issuing step includes issuing a plurality of commands to the at least one actuator using the operator interface to place the tool in a position relative to the vehicle. The recording step records the commands issued in the issuing step. The positioning step includes positioning the tool in another position different from the position. The replaying step includes replaying at least some of the commands recorded in the recording step, thereby repositioning the tool substantially in the original position.

DETAILED DESCRIPTION OF THE INVENTION

Figure 1:
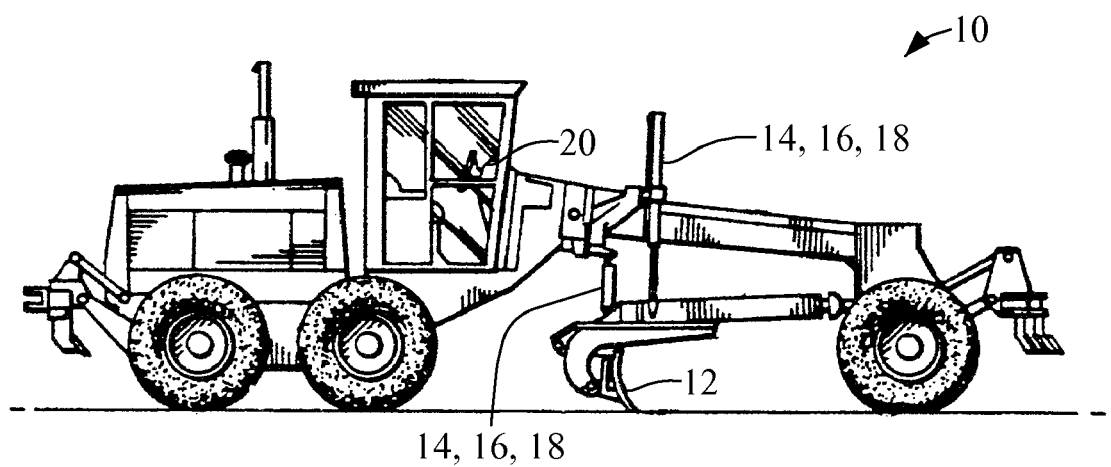
FIG. 1 is a side view of one embodiment of the control system of the present invention used in a motor grader.

Now, referring to the drawings, and more particularly to FIG. 1 there is shown a ground engaging vehicle 10 which may be in the form of a motor grader 10 having a blade 12, hydraulic cylinders 14, electrohydraulic valves 16, position sensors 18 and an electronic controller 20. Motor grader 10 is controlled by an operator that adjusts control valves to position blade 12 into a desired position for making an earth moving pass across the ground. In addition to adjusting blade 12, the operator additionally selects a gear in a transmission and a motor speed to drive vehicle 10 to thereby grade the ground.

Hydraulic cylinders 14 include electrohydraulic valves 16 and position sensors 18. Position sensors 18 track the linear actuation and/or rotational position of actuators, herein referred to as hydraulic cylinders 14. Electrohydraulic valves 16 may be of a continuously variable electrohydraulic valve type that receives an electrical signal to thereby control the flow of hydraulic fluid into and/or out of hydraulic cylinder 14 to thereby reposition the shaft extending from hydraulic cylinder 14, the shaft having a yoke on a distal end. Position sensors 18 provide information on the position of hydraulic cylinders 14 and issue a signal that is sent to controller 20. Additionally, a feedback system may exist between an electrohydraulic valve 16 and a position sensor 18 associated with a particular cylinder 14 to assist in the positioning and actuation of hydraulic cylinder 14. Electrohydraulic valves 16 and position sensors 18 may be integral with hydraulic cylinders 14 and may utilize one or more signal lines to convey information to and from controller 20 to each electrohydraulic valve 16 and position sensor 18.

In addition to position sensor 18 providing position information relative to hydraulic cylinders 14, sensors in cylinders 14 may transmit force information to controller 20, which can relate to the force being placed on blade 12 as it encounters the earth. Sensors apart from cylinders 14 may also provide force information to controller 20. These sensors can also be used in the positioning of blade 12 in several ways including to ensure that blade 12 is not in some manner unduly constrained from being positioned into the desired position. The forces encountered in the positioning of blade 12 may be recorded by the method for comparison with the forces encountered when blade 12 is re-positioned.

Figure 2:
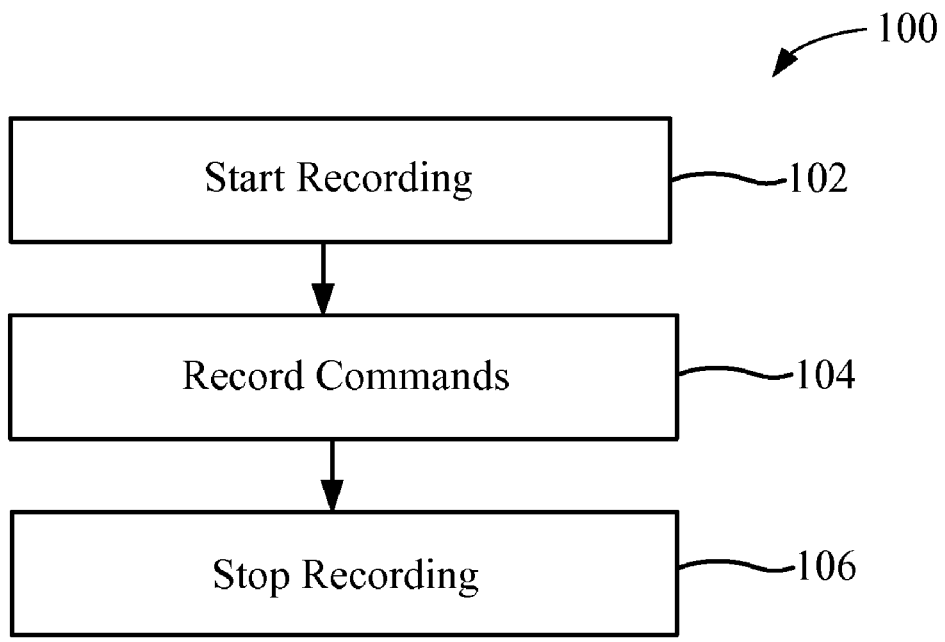
FIG. 2 is a flow chart illustrating a portion of the method of the present invention used in the motor grader of FIG. 1.
Figure 3:
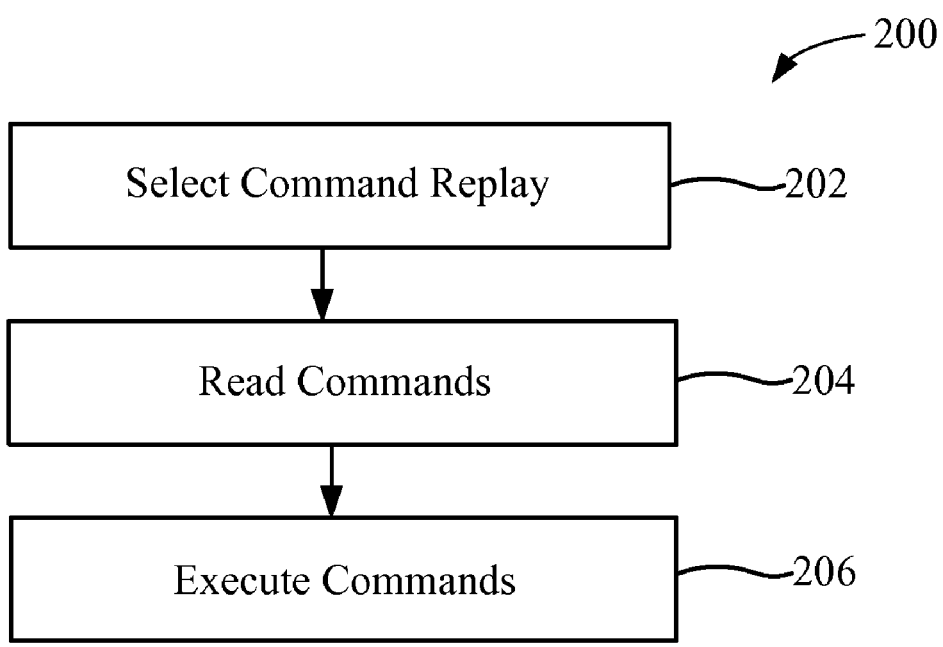
FIG. 3 is a flow chart representing another portion of the method of the present invention utilized by the motor grader of FIG. 1.

Now, additionally referring to FIG. 2 there is illustrated a method 100 that illustrates one portion of the method utilized to control vehicle 10. A controlling feature on controller 20 allows operator to initiate the recording of operations in preparation of vehicle 10 to make a pass along and over the ground. To initiate the recording of a series of commands issued by the operator in the form of positioning valves, selecting a gear and speed of the motor or other variables, the operator initiates the recording sequence at step 102. The initiating of the recording may be done by the depressing of a button or selecting of an icon on a computer driven screen. The recorded sequence may be identified so that multiple positioning and operating scenarios can be recorded and selected from a list of recorded sequences. The recording of the commands takes place at step 104 and records the operating of the grader controls whether the operation of the controls are sequential or occur simultaneously, such as when the operator is moving more than one control at a time to position the blade. Once the sequence of commands have been issued to hydraulic cylinders 14 and the selection of engine speed and transmission gear and any other variables have been made, the operator will stop recording of the sequence at step 106. The recorded information is then stored so that it can be selected and replayed to re-position blade 12, the gear selection and for engine speed so that the grading of the ground can be replicated at a later time.

Now, additionally referring to method 200 there is shown another portion of the method of the present invention, which includes the selection to initiate a command replay at step 202. This selection is similar to the start recording selection at step 102, and can be initiated by way of a button, graphic icon or touch screen command selected by the operator. The operator may select what series or named sequence of commands are to be repeated by controller 20. Once initiated at step 202, controller 20 reads the commands at step 204 from the memory system and then executes the commands at step 206 to thereby reposition blade 12 and other variables in the operating of vehicle 10. The execution of commands at step 206 may be in the exact sequence that the operator utilized in the recording of the commands in method 100, or controller 20 may seek to position tool blade 12 into a final position, which may result in skipping some intermediate steps such as the jogging of the position of blade 12 by the operator. For example, if in method 100 the operator adjusted blade 12 too far in a vertical position and then retracted the blade to the desired position, method 20 may skip the portion of the sequential commands to simply position the blade in the final desired position without overshooting the vertical height positioning.

Figure 4:
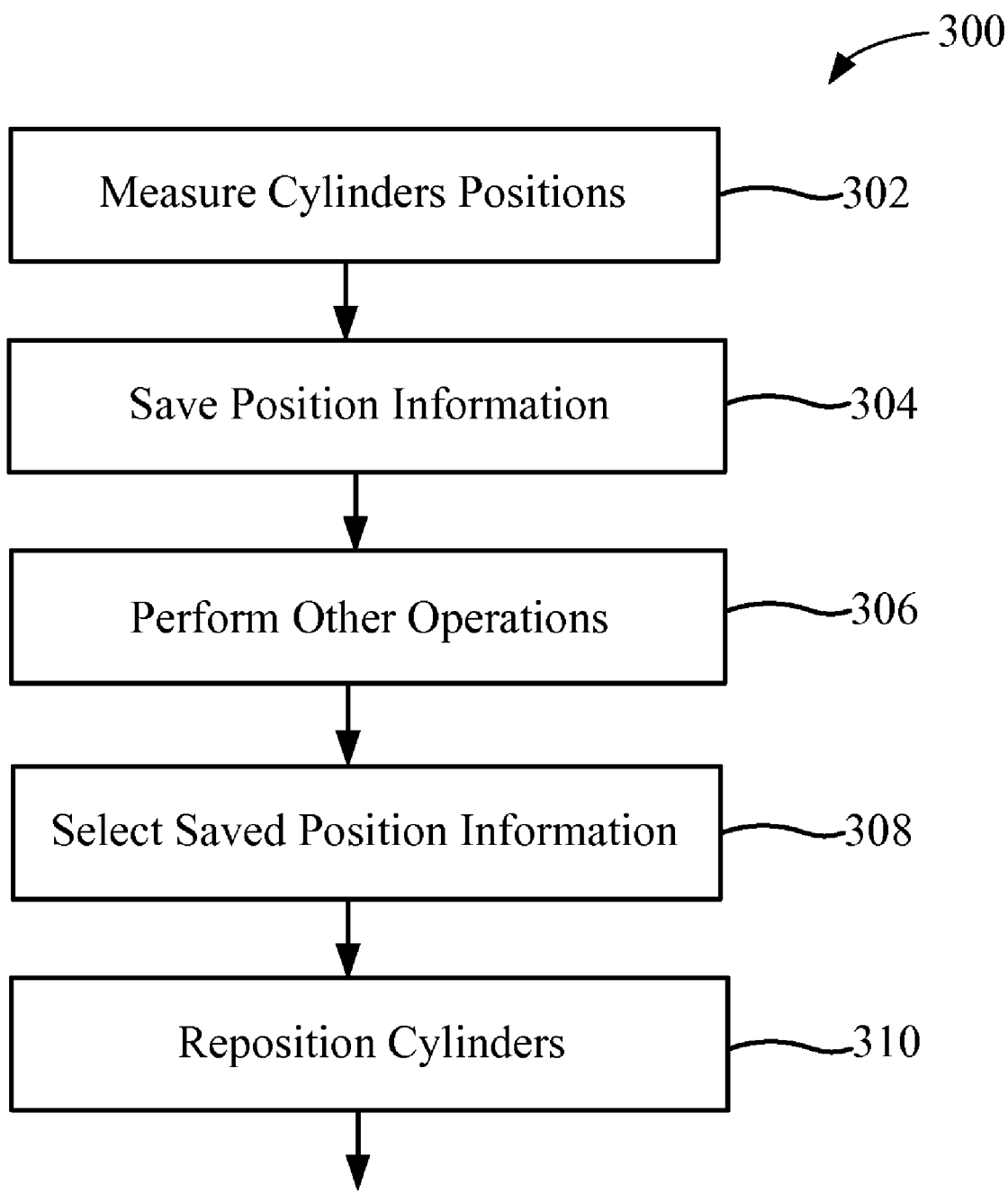
FIG. 4 is a flow chart illustrating a portion of a method utilized a control system of the motor grader of FIG. 1.

Now, additionally referring to FIG. 4, there is shown a method 300 that is another portion of the present invention utilized in controlling positioning of blade 12 and other variables in the operation of vehicle 10. At step 302 the cylinder positions are measured once blade 12 is positioned by way of hydraulic cylinders 14. The positional information of cylinders 14 is saved at step 304, which constitutes the operating position of blade 12. As previously discussed, when commands are recorded at step 104 rather than recording each iterative movement of blades 12, method 300 reflects one embodiment of the present invention by the measuring of the position of cylinders 14 either on a continuous basis until step 106 or method 300 may be at least partially executed by the initiation of method 300 by the execution of step 106. Once the positional information has been saved at step 304 it may relate to some additional commands that are issued by the operator relative to the operating speed of vehicle 10 and any other variables associated with the operation of vehicle 10. After other functions have been performed at step 306, for example vehicle 10 has made a pass along one side of a road and is now going to return along an opposite side of the road and the desired grade at that portion of the road to be graded varies the operator would reposition control systems for the return trip, record the commands by execution of method 100 storing that sequence as a second operating condition and return along the other side of the grade path. This is what is referred to as performing other operations at step 306 and may as in the previous example include operation of method 100 for the saving of a different operating condition. Once the operator has went to a location where the settings of the first recording are now desirable, then at step 308 the saved positional information is selected, which may be included as a portion of step 204 where other commands may be read that will be executed along with the positioning information of step 308. At step 310 hydraulic cylinders 14 are repositioned associated with the particular command set that is replayed at step 202 through 206. The execution of the commands at step 206 may include the repositioning of the cylinders in step 310 along with the selection of motor speed gear ratios and other variables that the operator has selected previously by way of method 100.

Electronic signals from controller 20 interfaces with the electrohydraulic system and controller 20 may record not only which function is actuated by the operator but the speed and the rate at which the function is engaged and how far the movement or selection of a variable is undertaken. Advantageously, the present invention eliminates the amount of operator input that is required in replicating a position and operational sequence of the grader system. This allows numerous operator inputs to be duplicated to reduce the amount of operator time required to reposition the system. At the operator's command the operating system and method of the present invention can read each cylinders position, and allow the operator to command the machine to return to this recorded position. This system reduces operator fatigue and eliminates numerous, sometimes simultaneous motions of the control mechanisms and improves the operator comfort. The present invention may even reduce a required skill level to operate the motor grader and improves the motor grader productivity.

Having described the preferred embodiment, it will become apparent that various modifications can be made without departing from the scope of the invention as defined in the accompanying claims.

The invention claimed is:
1. A ground engaging vehicle, comprising:
  a tool connected to the vehicle;
  at least one actuator coupled to said tool;
  an electronic controller controllably coupled to said at least one actuator, said controller including an operator interface, said controller configured for:
    issuing a plurality of commands to said at least one actuator using said operator interface to place said tool in a position relative to the vehicle;
    recording forces encountered by said tool as said tool is placed in said position, thereby defining recorded forces;
    recording said commands;
    positioning said tool in an other position different from said position;
    replaying at least some of said commands recorded in said recording step thereby repositioning said tool substantially in said position; and
    ensuring said tool is not constrained from reaching said position.
2. The ground engaging vehicle of claim 1, wherein said at least one actuator is a hydraulic cylinder hydraulically connected to an electrohydraulic valve, said controller further configured for comparing forces encountered by said tool while said replaying step is being executed to said recorded forces.
3. The ground engaging vehicle of claim 1, wherein said controller is further configured for:
  starting said recording step; and
  ending said recording step, said recording step recording a command sequence while said recording step is enabled between said starting step and said ending step.
4. The ground engaging vehicle of claim 3, wherein said replaying step replays said command sequence.

5. The ground engaging vehicle of claim 4, wherein said command sequence is executed in said replaying step in the order said command sequence was executed between said starting step and said ending step.

6. The ground engaging vehicle of claim 4, wherein said command sequence is executed in an order other than the order said command sequence was executed between said starting step and said ending step.

7. The ground engaging vehicle of claim 4, wherein said replaying step executes a series of commands that place said tool in said position without executing all of said commands in said command sequence.

8. The ground engaging vehicle of claim 3, wherein said controller is further configured for identifying and storing a plurality of command sequences.

9. The ground engaging vehicle of claim 8, wherein said controller is further configured for selecting one of said command sequences stored in said storing step for use by said replaying step.

10. The ground engaging vehicle of claim 1, further comprising a power source connected to the vehicle, said recording step including recording at least one of said position of said tool, a speed of the vehicle, a speed of said power source and at least one force on said at least one actuator.

11. A control system for a ground engaging vehicle with a tool connected to the vehicle and at least one actuator coupled to the tool, the control system comprising:
an electronic controller controllably coupled to the at least one actuator, said controller including an operator interface, said controller configured for:
issuing a plurality of commands to the at least one actuator using said operator interface to place the tool in a position relative to the vehicle;
recording forces encountered by said tool as said tool is placed in said position, thereby defining recorded forces;
recording said commands;
positioning the tool in an other position different from said position;
replaying at least some of said commands recorded in said recording step thereby repositioning the tool substantially in said position; and
ensuring said tool is not constrained from reaching said position.

12. The control system of claim 11, wherein the at least one actuator is a hydraulic cylinder hydraulically connected to an electrohydraulic valve, said controller further configured for comparing forces encountered by said tool while said replaying step is being executed to said recorded forces.

13. The control system of claim 11, wherein said controller is further configured for:
starting said recording step; and
ending said recording step, said recording step recording a command sequence while said recording step is enabled between said starting step and said ending step.

14. The control system of claim 13, wherein said replaying step replays said command sequence.

15. The control system of claim 14, wherein said command sequence is executed in said replaying step in the order said command sequence was executed between said starting step and said ending step.

16. The control system of claim 14, wherein said command sequence is executed in an order other than the order said command sequence was executed between said starting step and said ending step.

17. The control system of claim 14, wherein said replaying step executes a series of commands that place said tool in said position without executing all of said commands in said command sequence.

18. The control system of claim 13, wherein said controller is further configured for identifying and storing a plurality of command sequences.

19. The control system of claim 18, wherein said controller is further configured for selecting one of said command sequences stored in said storing step for use by said replaying step.

20. The control system of claim 11, further comprising a power source connected to the vehicle, said recording step including recording at least one of said position of said tool, a speed of the vehicle, an RPM speed of said power source and at least one force on said at least one actuator.

* * * * *